(12) United States Patent
Yoon

(10) Patent No.: US 6,706,345 B1
(45) Date of Patent: *Mar. 16, 2004

(54) BIODEGRADABLE PLASTIC CONTAINER HAVING A MOISTURE PERMEABILITY

(75) Inventor: Yeo Saeng Yoon, Seoul (KR)

(73) Assignee: Boo Yoon Tech Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/594,592

(22) Filed: Jun. 15, 2000

(30) Foreign Application Priority Data

Feb. 18, 2000 (KR) .......................................... 2000-7740

(51) Int. Cl.⁷ .............................................. C08G 63/16
(52) U.S. Cl. ................... 428/35.7; 206/524.1; 220/675; 428/36.6; 428/36.92
(58) Field of Search ............... 428/35.7, 36.6, 428/36.92

(56) References Cited

U.S. PATENT DOCUMENTS 5,171,308 A * 12/1992 Gallagher et al. .......... 604/372
5,206,087 A * 4/1993 Tokiwa et al. .............. 428/403
5,428,126 A * 6/1995 Kashima et al. ............ 528/490
5,589,566 A * 12/1996 White et al. ................ 528/286
5,849,401 A * 12/1998 El-Afandi et al. .......... 428/215
6,096,809 A * 8/2000 Lorcks et al. ................ 524/47
6,140,458 A * 10/2000 Terado et al. ............... 528/272

FOREIGN PATENT DOCUMENTS

JP        61097419 A    *   5/1986
JP        10025336 A       1/1998 .......... A01G/16/00

OTHER PUBLICATIONS

Webster's New World Dictionary, 3rd College Edition (1988), p. 197.*

* cited by examiner

Primary Examiner—Sandra M. Nolan
(74) Attorney, Agent, or Firm—McGuireWoods LLP

(57) ABSTRACT

The present invention relates to a plastic container which has a good biodegradability and a moisture permeability manufactured by using a novel polyester resin composition under a specific injection and extrusion molding conditions in the forms of a bottle, a blister pack, a medicated paper pouch and the like, which thus enables to preserve the contents of the container such as pharmaceutical drugs, food and beverages dry without the addition of desiccants and can be disposed of without causing environmental contamination.

4 Claims, 1 Drawing Sheet

BIODEGRADABLE PLASTIC CONTAINER HAVING A MOISTURE PERMEABILITY

BACKGROUND OF THE INVENTION

1. Field of the Invention

Figure 1:
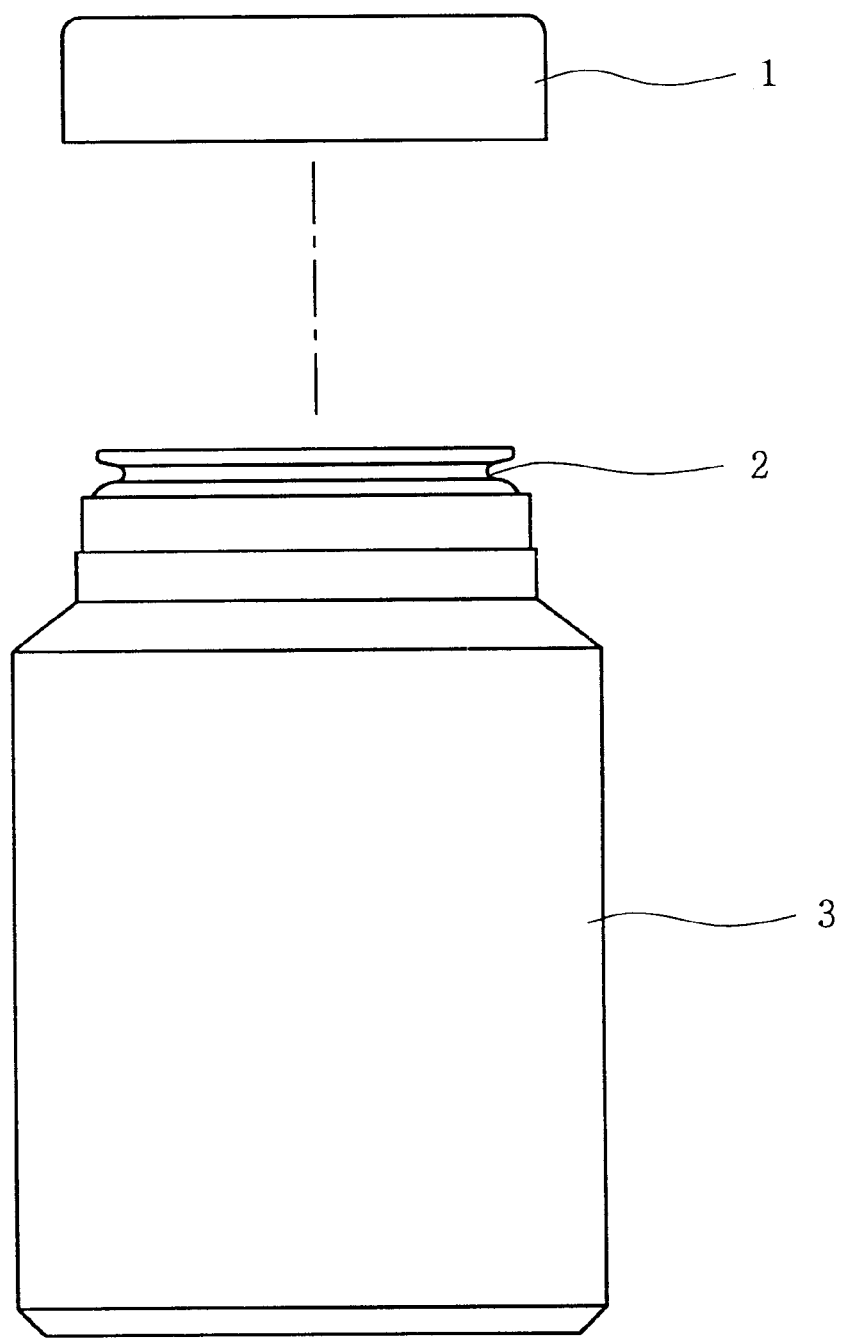

The present invention relates to a biodegradable plastic container having a moisture permeability and more particularly, to a biodegradable plastic container having a moisture permeability manufactured in the forms of a bottle, a blister pack, a medicated paper pouch and the like, by using a novel polyester resin composition under a specific injection and extrusion-molding conditions, thus being able to keep the contents of the container dry without any addition of desiccants and be disposed of without causing environmental contamination.

2. Description of the Related Art

Biodegradable resins have been welcomed worldwide since their first appearance in the market since they can be disposed of without causing environmental contamination and their uses are on the gradual increase these days.

There have been known various kinds of biodegradable resins so far; however, their applications to commercial products have been much limited because their physical properties, molecular weight and biodegradability are not suitable for good molding and quality products.

The aliphatic polyester, known to have a good biodegradable property (J of Macromol. SCI-Chem., A-23(3), 1986, pp. 393–409), have been used as materials in medical, agricultural, fishing and packaging industries and its fields of applications are on gradual growth. However, the conventional type of aliphatic polyesters had disadvantages that their backbone structures were too soft and heat-labile, it had low crystallinity, low melting point, difficulty in molding due to high melt index, poor tensile strength and tear strength. To make these aliphatic polyesters more applicable, many efforts have been exerted to increase the number average molecular weight of the current aliphatic polyester to have more than 30,000, however, it has not been able to obtain aliphatic polyester having a molecular weight greater than 15,000 in the conventional polycondensation system.

As a way to solve these problems of conventional polyesters, a method of manufacturing aliphatic polyester resin having a number average molecular weight of greater than 30,000 by adjusting factors such as reaction temperature, degree of vacuum and amount of catalysts was disclosed in Korean Unexamined Patent Publication No 95-758; however, said aliphatic polyester resin had a low weight average molecular weight and was also heat-labile thus not considered appropriate in molding or forming.

Korean Unexamined Patent Publication No 95-114171 discloses a method of manufacturing aliphatic polyester with a high molecular weight by incorporating monomers such as a polyhydric (at least tri-) alcohol or a poly (at least tri-) hydric carboxylic acid. The above process provided a way to improve the molding and forming properties of the aliphatic polyester resin by introducing the monomers into the reactor to reduce the reaction time and to diffuse the molecules within the product. However, the application of this type of polyester resin was not easy due to the decrease of physical properties such as tensile strength resulted from the drastic increase in low molecular weight polyesters. Besides, the fact that the polyester resin easily becomes a gel type makes it difficult to control the reaction for preparing the polyester resin. There is still another process for increasing the molecular weight of the aliphatic polyester resin. Unexamined Korean Patent Publication No. 95-25072, which discloses the high molecular weight aliphatic polyester resin produced by an isocyanate as a coupling material reacting to an aliphatic polyester resin having a number average molecular weight of 15,000 to 20,000 which is produced by dehydration or de-glycol reaction of the mixture of main materials of (1) an aliphatic(including cyclic type), and (2) an aliphatic (including cyclic type) dicarboxylic acid(or an acid anhydride thereof), and a little of (3) monomer of polyhydric alcohol or polyhydric carboxylic acid (or an acid anhydride thereof). The aliphatic polyester resin obtained in this way had a number average molecular weight of 20,000 to 70,000. However, the above-mentioned process has a few drawbacks that it requires more reaction time thus resulting in poor productivity, and the isocyanate, a coupling material to increase the molecular weight of polyester resin, is known to be a carcinogen so necessitating an extremely careful handling of the ingredient.

SUMMARY OF THE INVENTION

The object of the present invention is to manufacture a plastic container having a good biodegradability by using a biodegradable polyester resin composition with a novel structure and excellent physical properties so that it can be degraded in nature without causing environmental contamination when disposed. Another object of the present invention is to manufacture said plastic container so that it can also have a good permeability to both moisture and carbon dioxide in order to keep the contents of a container dry without the addition of desiccants.

DESCRIPTION OF THE PRESENT INVENTION

The present invention relates to a plastic container comprising polyester resin having 9,000–90,000 of number average molecular weight, 30,000–600,000 of weight average molecular weight, 40–150° C. of melting point, 0.1–50 g/10 min of melting viscosity(190° C., 2160 g), which has both a good biodegradability and a moisture permeability.

FIG. 1 shows a bottle in accordance with the invention. The bottle or container is shown as reference numeral 3 and includes neck 2 and cap 1.

The resin composition used in the present invention comprises one or more selected from an aromatic dicarboxylic acid (or an acid anhydride thereof) such as dimethyl terephthalate and terephthalic acid, an aliphatic (including cyclic type) dicarboxylic acid(or an acid anhydride thereof) such as succinic acid and adipic acid, an aliphatic (including cyclic type) glycol such as 1,4-butanediol and ethylene glycol, by means of esterification and polycondensation reactions as disclosed in Unexamined Korean Patent Publication Nos. 98-33837, 98-33834, 99-56991 and 99-58816. Further, the polyester resin composition in the present invention has the moisture permeability of 70–120 measured at 37.8° C., 90% RH for 24 hrs.

The polyester resin in the present invention is an aliphatic polyester resin which has superior physical properties to resolve the limitations used to be present in the conventional biodegradable types and also provides an excellent biodegradability and a moisture permeability due to its peculiar molecular structure.

The specific physical properties of the biodegradable polyester resin with a moisture permeability in the present invention can be represented as shown in the following Table 1. Here, the moisture permeability was measured at 37.8° C., 90% RH for 24 hrs.

TABLE 1

| MP(° C.) | Injection (° C.) | Tensile Strength (kg/cm²) | Elongation (%) | Decomposition (%) | Moisture-Permeability |
|---|---|---|---|---|---|
| 40–70 | 130–140 | 330 | 700 | 98 | 80 |
| 90 | 140–150 | 350 | 700 | 96 | 100 |
| 100 | 150–160 | 400 | 600 | 94 | 110 |
| 110–150 | 160–170 | 400 | 300 | 90 | 120 |

According to the present invention, in the case of extrusion molding for the above resins it is preferred to produce flexible materials such as films used for blister packs, wherein the appropriate melting point of the resin ranges from 40 to 100° C., more preferably from 70 to 100° C. If the melting point is below the above range the forming becomes hard to adjust properly due to slow crystallinity while the quality of the product becomes devalued if it exceeds the range.

Injection molding is generally used in producing hard and durable products and its appropriate melting temperature ranges from 100 to 150° C., more preferably from 105 to 120° C.; however, if the temperature is too low the quality of plastic container becomes poor. The melting points of conventional polypropylene plastic containers fall between 180 and 220° C. and thus the properties of those containers are totally different from the one in the present invention. Injection or extrusion molding using the above resins may be performed under general temperature conditions, however, the preferred temperature ranges from 120 to 190° C., and more preferably from 130 to 170° C. If the molding is performed at a temperature lower than 120° C. it is hard to produce a desirable product because the resins within the screw will not be melted completely while physical properties become poor if it is performed at a temperature higher than 190° C. The conventional types of resins have different molding temperature range, e.g., 230–275° C. for PP resin and 220–250° C. for ABS resin. However, if the resins in the present invention are molded under temperatures for conventional resins, the resins will not be appropriate for molding because they will be easily decomposed by heat and their physical properties will become extremely poor. Further, if the resins in the present invention are kept to stay within the screw of injection or extruder for more than 10 min the molding cannot be well proceeded and subsequently the molded product would not be able to carry the proper properties of container if they are molded.

For the production of highly durable containers, the resin may be combined with an additive to fortify strength selected from talc, calcium carbonate, magnesium stearate, calcium sulfate, sugar powder, particular anhydrous silicate, calcium phosphate, and more preferably by adding 1–60 wt. % of talc or calcium carbonate based on the 100% by weight of resin, which then enables to improve the strength of the resins in the present invention comparable to the conventional resins such as polypropylene, polystyrene or ABS resins. Calcium carbonate is inferior to talc in increasing strength, however, it can be served as a fertilizer and prevent the soils from being acidified when it becomes biodegraded and left on the surface of soils after burial. In addition, the combustion rate of calcium carbonate added resin was better than those of resin alone or talc-added resin in the present invention. Examples of strength fortifiers in manufacturing medical equipments in addition to the above mentioned talc and calcium carbonate are magnesium stearate, calcium sulfate, sugar powder, particular anhydrous silicate, and calcium phosphate.

The biodegradable containers produced according to the present invention have a moisture permeability and are thus able to keep contents in said containers to stay in the original condition without quality deterioration even when exposed to a humid environment. Moreover, the container of the present invention enables to get rid of carbon dioxide as well as all the internal moisture out of the container while preventing external moisture from being introduced. Therefore, the containers produced in accordance with the present invention do not need to add any desiccant even when storing pharmaceutical drugs of tablets or capsules, foods and others which need to be kept dry.

The containers in the present invention can be produced in various forms including bottles, packs for capsules, blister packs, medicated paper pouches, tetrahedrons and the like.

The following examples are intended to be illustrative of the present invention and should not be construed as limiting the scope of this invention defined by the appended claims.

PREPARATION EXAMPLE 1

To a 500 mL Erlenmeyer's flask filled with nitrogen gas, 118 g of succinic acid and 12 g of aminosalicylic acid were added and esterified while slowly increasing the temperature until it reaches 200° C. and water was effused out. When the temperature reached 200° C., the water was effused completely. 92 g of ethylene glycol and 0.1 g of tetrabutyltitanate, a catalyst, were added to the reaction mixture under nitrogen gas and the mixture was allowed to react at 200° C. for 2 hrs and then theoretical mash of water was effused. 0.1 g of antimony acetate, 0.2 g of dibutyltin oxide, 0.07 g of tetrabutyltitanate as catalysts, and 0.2 g of trimethyl phosphate as a stabilizer were added to the reaction mixture. The temperature was raised and a polycondensation reaction was performed under 0.3 torr at 245° C. for 150 min. The sample of biodegradable resin taken at this point had a melting viscosity of 9 (190° C., 2160 g), number average molecular weight of 33,000, weight average molecular weight of 240,000 and the melting point of 98° C. as measured by DSC method.

PREPARATION EXAMPLE 2

To a 500 mL Erlenmeyer's flask filled with nitrogen gas 118 g of succinic acid, 121.7 g of 1,4-butanediol and 0.1 g of tetrabutyltitanate as a catalyst, were added to the flask while slowly increasing the temperature until it reached 200° C. When the temperature reached 200° C., the reaction mixture was molecular weight of 290,000 and melting point of 98° C. as measured by DSC method.

PREPARATION EXAMPLE 4

To a 500 mL Erlenmeyer's flask filled with nitrogen gas was added 2.95 g of succinic acid, 6.3 g of 1,4-butanediol and 0.1 g of tetrabutyltitanate, a catalyst, and water was effused by means of esterification while slowly increasing the temperature until it reached 205° C. When the temperature reached 205° C., theoretical mass of water was effused completely out to produce 9.3 g of aliphatic low molecular weight polymer with its molecular weight around 1,500. Then, 78.8g of dimethyl terephthalate, 126 g of 1,4-butanediol, 6.2 g of ethylene glycol and 0.2 g of tetrabutyltitanate, a catalyst, were added to the reaction mixture and methanol was effused completely at 205° C. and 70.8 g of succinic acid was added for esterification. Here, the temperature was set at 180° C. and after water was effused completely and 0.1 g of antimony trioxide, 0.3 g of dibutyltin oxide, 0.07 g of tetrabutyltitanate as catalysts, and 0.1 g of trimethyl phosphate as a stabilizer were added. The temperature was raised until it reached 245° C. and a polycondensation reaction was performed under 0.3 torr at 245° C. for 220 min. The sample of biodegradable resin taken at this point had a melting viscosity of 7 (190° C., 2160 g), number average molecular weight of 47,000, weight average molecular weight of 230,000 and melting point of 90° C. as measured by DSC method.

EXAMPLE 1~2

Containers were manufactured by using polyester resins having 98° C. of melting point produced in the above Preparation Examples 1 and 3 under 140–160° C. by means of injection molding. The test results of containers showed that 360 kg/cm$^2$ and 380 kg/cm$^2$ for tensile strength, 350% and 340% allowed to react for 2 hrs and then theoretical mass of water was effused. Then 0.1 g of antimony acetate, 0.2 g of dibutyltin oxide, 0.07 g of tetrabutyltitanate as catalysts, and 0.2 g of trimethyl phosphate as a stabilizer were added. The temperature was raised and a polycondensation reaction was performed under 0.3 torr at 245° C. for 155 min. The sample of biodegradable resin taken at this point had a melting viscosity of 15 (190° C., 2160 g), number average molecular weight of 31,000, weight average molecular weight of 190,000 and melting point of 117° C. as measured by DSC method.

PREPARATION EXAMPLE 3

To a 500 mL Erlenmeyer's flask filled with nitrogen gas, 8.5 g of dimethyl terephthalate and 25 g of 1,4-butanediol were added while slowly increasing the temperature until it reached 200° C. When the temperature reached 200° C., methanol was effused completely out by means of ester-substitution reaction. 5.9 g of succinic acid, 7.3 g of adipic acid were added and adjusted the temperature to 180° C. to produce 28 g of aromatic/aliphatic low molecular weight polymer with its molecular weight around 10,000 by effusing the water completely by means of esterification. Then, 107 g of succinic acid, 135 g of 1,4-butanediol, 14.6 g of adipic acid and 0.4 g of tetrabutyltitanate, a catalyst, were added to the reaction mixture in nitrogen gas and temperature was raised until it reached 200° C. When the temperature reached 200° C., the reaction mixture was allowed to react for 2 hrs and then theoretical mass of water was effused. To the above was added 0.1 g of antimony acetate, 0.2 g of dibutyltin oxide, 0.07 g of tetrabutyltitanate as catalysts, and 0.2 g of trimethyl phosphate as a stabilizer. The temperature was raised until it reached 245° C. and a polycondensation reaction was performed under 0.3 torr at 245° C. for 200 min. The sample of biodegradable resin taken at this point had a melting viscosity of 7 (190° C., 2160 g), number average molecular weight of 39,000, weight average for elongation, and 94% and 95% for decomposition rate after 45 days, respectively. The biodegradability was measured by Organic Waste Systems[O.W.S.n.v.] (Dok Noord 4, B-9000 Gent, Belgium), and tensile strength and elongation were measured by UTM.

EXAMPLE 3

Containers were manufactured by using polyester resin having 117° C. of melting point produced in the above Preparation Example 2 under 160–170° C. by means of injection molding. The test results of containers showed 400 kg/cm$^2$ of tensile strength, 300% of elongation, and 90% of decomposition rate after 45 days. The biodegradability was measured by Organic Waste Systems[O.W.S.n.v.].(Dok Noord 4, B-9000 Gent, Belgium), and tensile strength and elongation were measured by UTM.

EXAMPLE 4

Films for blister packs were manufactured by using polyester resin having 90° C. of melting point produced in the above Preparation Example 4 under 150–160° C. by means of extrusion molding. The test results of containers showed 380 kg/cm$^2$ of tensile strength, 700% of elongation, and 94% of decomposition rate after 45 days. The biodegradability was measured by Organic Waste Systems [O.W.S.n.v.](Dok Noord 4, B-9000 Gent, Belgium), and tensile strength and elongation were measured by UTM.

EXPERIMENTAL EXAMPLE 1

In order to compare the moisture permeability between containers manufactured in the above Examples 1–4 and those of conventional type of resins (PE products and PP products), 100 g of soft capsule was added to each 500 mL container and the containers were then sealed. The amount of moisture that pharmaceutical drug in each container contains was stored under 40% RH (relative humidity) at 75° C. and measured according to time passage, respectively. In the case of the blister pack, the rear side of each pack was individually sealed with aluminum foil and the amount of moisture absorbed was measured according to time passage. None of the containers were added with desiccants.

TABLE 2

| Classification | Ex. 1 | Ex. 2 | Ex. 3 | Ex. 4 | PE Product | PP Product |
|---|---|---|---|---|---|---|
| O Day | 8.2116 | 8.3005 | 8.3306 | 8.4456 | 8.2041 | 8.4484 |
| 10 Days | 8.2094 | 8.2971 | 8.3114 | 8.3321 | 8.2745 | 8.6541 |
| 50 Days | 8.2041 | 8.2623 | 8.2808 | 8.2811 | 8.3514 | 8.7774 |
| 200 days | 8.1948 | 8.2077 | 8.2103 | 8.2173 | 8.6119 | 8.8065 |

(Ex. = Example, Unit; g)

As shown in the above Table 2, the amount of moisture absorbed in drugs in the containers already in the market was increased as time went by, whereas that absorbed in drugs in the containers manufactured according to the present invention was decreased. Thus it was proved that the biodegradable containers produced in accordance with the present invention provides excellent moisture permeability by preventing from absorbing moistures from outside to inside.

EXPERIMENTAL EXAMPLE 2

A container with a volume capacity of 200 mL was produced by using 150 μm thick film which was made of the materials manufactured in the above Preparation Example 1. The container was added then with a 100 mL solution containing carbon dioxide and sealed thereafter. Twenty samples were produced and stored under 50% RH at 25° C. for 10 days and none of the above containers were swollen, thus implying that biodegradable containers produced according to the present invention are permeable to carbon dioxide.

EXPERIMENTAL EXAMPLE 3

A container with a volume capacity of 200 mL was produced by using 150 μm thick film which was made of the materials manufactured in the above Preparation Example 2. The container was then half-filled with powder containing carbon dioxide and sealed thereafter. Twenty samples were produced and stored under 50% RH at 25° C. for 10 days and none of them were swollen, thus implying that biodegradable containers produced according to the present invention are permeable to carbon dioxide.

COMPARATIVE EXAMPLE 1

A container with a volume capacity of 200 mL was produced by using 150 µm thick PE film for medical blister packs on market and was then added with 100 mL solution containing carbon dioxide and sealed thereafter. Twenty samples were produced and stored under 50% RH at 25° C. for 10 days and all twenty samples were swollen.

COMPARATIVE EXAMPLE 2

A container with a volume capacity of 200 mL was produced by using 150 µm thick PVC film for medical blister packs in the market and was then half-filled with powder containing carbon dioxide and sealed thereafter. Twenty samples were produced and stored under 50% RH at 25° C. for 10 days and all twenty samples were swollen.

What is claimed is:

1. A plastic biodegradable container made from a polymer prepared by the polycondensation of a dicarboxylic acid and a glycol, the biodegradable container comprising:

a biodegradable polyester resin consisting essentially of a polycondensate of succinic acid with an aliphatic glycol selected from the group consisting of 1,4-butanediol and ethylene glycol, wherein said polyester resin has a number average molecular weight of 9,000–90,000, a weight average molecular weight of 30,000–600,000, a melting point of 70–150° C., and a melt index (190° C., 2160 g) of 0.1–50 g/min, and a moisture permeability of 70–120 measured at 37.8° C., 90% RH for 24 hours, and wherein said container is produced by molding at above 120° C.

2. The biodegradable plastic container in accordance with claim 1, wherein talc or calcium carbonate is added as a strength fortifier in the ratio of 1–60% by weight to said polyester resin composition.

3. The biodegradable plastic container in accordance with claim 1 wherein the container is made by extrusion or injection molding at 130–170° C.

4. The biodegradable plastic container in accordance with claim 1, wherein the types of said containers include a bottle, a blister pack, a medicated paper pouch and a tetrahedron.

* * * * *